(12) United States Patent
Brooks et al.

(10) Patent No.: US 9,948,399 B2
(45) Date of Patent: Apr. 17, 2018

(54) METHODS AND APPARATUS FOR REMOVING BEAT INTERFERENCE FROM SPLITTERS/COMBINERS

(71) Applicant: Time Warner Cable Enterprises LLC, New York, NY (US)

(72) Inventors: Paul D. Brooks, Charlotte, NC (US); Peter H. Wolff, Bradenton, FL (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 53 days.

(21) Appl. No.: 14/593,867

(22) Filed: Jan. 9, 2015

(65) Prior Publication Data

US 2016/0204877 A1    Jul. 14, 2016

(51) Int. Cl.
*H04B 10/29* (2013.01)
*H04B 10/2507* (2013.01)

(52) U.S. Cl.
CPC ......... *H04B 10/29* (2013.01); *H04B 10/2507* (2013.01)

(58) Field of Classification Search
CPC ............. H04B 10/29; H04B 10/2503; H04B 10/2507; H04B 10/2543–10/2563; H04B 2210/256; H04Q 11/0071; H04Q 2011/0049; H04Q 2011/0096
See application file for complete search history.

(56) References Cited

U.S. PATENT DOCUMENTS

| | | |
|---|---|---|
| 5,189,671 A | 2/1993 | Cheng |
| 5,341,365 A | 8/1994 | Clarke |
| 5,453,988 A | 9/1995 | Clarke |
| 5,548,432 A | 8/1996 | Clarke et al. |
| 5,574,584 A | 11/1996 | Darcie et al. |
| 5,694,234 A | 12/1997 | Darcie et al. |
| 5,809,187 A | 9/1998 | Peck, Jr. et al. |
| 5,864,413 A | 1/1999 | Feldman et al. |
| 5,930,018 A | 7/1999 | Effenberger |
| 6,108,713 A | 8/2000 | Sambamurthy et al. |
| 6,144,471 A | 11/2000 | Eyberg et al. |

(Continued)

OTHER PUBLICATIONS

A. J. Phillips, et al., "Redundancy Strategies for a High Splitting Optically Amplified Passive Optical Network", J. Lightwave Technol., vol. 19, No. 2, pp. 137-149, Feb. 2001.

(Continued)

*Primary Examiner* — David Payne
*Assistant Examiner* — Casey Kretzer
(74) *Attorney, Agent, or Firm* — Gazdzinski & Associates, PC

(57) ABSTRACT

Methods and apparatus for removing beat interference from the splitting and/or combining of signals. In one embodiment, an active splitter/combiner receives multiple input optical signals from downstream communication resources via a number of individual point-to-point links. Each input optical signal is converted to an electric signal (which, unlike the input optical signals, do not share a characteristic wavelength). The resulting electrical signals can be combined without introducing beat interference. Once combined, the resulting aggregate signal is converted back to an optical format for transmission via the optical network. Various other aspects of the present disclosure are directed to active splitting of optical signals.

20 Claims, 7 Drawing Sheets

(56) References Cited

U.S. PATENT DOCUMENTS

| | | |
|---|---|---|
| 6,327,400 B1 | 12/2001 | Harstead et al. |
| 6,493,335 B1 | 12/2002 | Darcie et al. |
| 6,563,613 B1 | 5/2003 | Tochio |
| 6,577,414 B1 | 6/2003 | Feldman et al. |
| 6,597,479 B1 * | 7/2003 | Chu .................. H04B 10/40 398/173 |
| 6,654,563 B1 | 11/2003 | Darcie et al. |
| 6,665,498 B1 * | 12/2003 | Jiang ................. H04B 10/801 398/135 |
| 6,681,083 B1 | 1/2004 | Koonen |
| 6,684,031 B1 | 1/2004 | Kogelnik et al. |
| 6,771,908 B2 | 8/2004 | Van Eijk et al. |
| 7,088,921 B1 | 8/2006 | Wood |
| 7,181,142 B1 | 2/2007 | Xu et al. |
| 7,218,854 B1 | 5/2007 | Unitt et al. |
| 7,283,554 B2 | 10/2007 | Ophir et al. |
| 7,602,820 B2 | 10/2009 | Helms et al. |
| 8,713,623 B2 | 4/2014 | Brooks |
| 8,837,853 B2 | 9/2014 | Tachi |
| 2002/0030865 A1 | 3/2002 | Kawate et al. |
| 2002/0041728 A1 | 4/2002 | Yamashita et al. |
| 2002/0063924 A1 | 5/2002 | Kimbrough et al. |
| 2002/0121937 A1 * | 9/2002 | Marutani ............... H03L 7/08 331/1 A |
| 2003/0063847 A1 * | 4/2003 | BuAbbud ........... H04J 14/0226 385/24 |
| 2003/0177215 A1 | 9/2003 | Sutherland et al. |
| 2004/0240466 A1 | 12/2004 | Unitt et al. |
| 2007/0274717 A1 | 11/2007 | Xu et al. |
| 2007/0297716 A1 * | 12/2007 | Helkey ................. H04B 1/18 385/16 |
| 2008/0273877 A1 | 11/2008 | Palacharla et al. |
| 2009/0232500 A1 | 9/2009 | Villarruel et al. |
| 2010/0098407 A1 * | 4/2010 | Goswami ........... H04B 10/032 398/5 |
| 2012/0321315 A1 | 12/2012 | Timm et al. |
| 2013/0148979 A1 * | 6/2013 | Hsiao .................. H04B 10/40 398/139 |
| 2013/0177314 A1 * | 7/2013 | Mizuguchi ........... H04J 3/0655 398/66 |
| 2014/0223504 A1 | 8/2014 | Ling et al. |
| 2014/0229604 A1 | 8/2014 | Pfeffer |
| 2015/0050016 A1 * | 2/2015 | Takita ................ H04J 14/0257 398/34 |
| 2015/0110489 A1 | 4/2015 | Brooks |

OTHER PUBLICATIONS

B.N. Desai, et al., An Optical Implementation of a Packet-Based (Ethernet) MAC in a WDM Passive Optical Network Overlay, in OFC '01 Tech Dig., paper WN5, Anaheim, CA, Mar. 2001.

C. J. Chae, et al., "A New ATM PON System Suitable for Local Access and Local Private Networking Services", in OFC '01 Tech. Deg., paper WU4, Anaheim, CA, Mar. 2001.

C.J. Chae, et al., "A PON System Suitable for Internetworking Optical Network Units Using a Fiber Bragg Grating on the Feeder Fiber", IEEE Photon. Technol. Lett., vol. 11, No. 12, pp. 1686-1688, Dec. 1999.

"Computer Networks" by A. Tanenbaum, Prentice-Hall, 1981, pp. 292-295.

Glen Kramer, et al., "Ethernet Passive Optical Network (EPON): Building a Next-Generation Optical Access Network", IEEE Commun. Mag., vol. 40, No. 2, pp. 66-73, Feb. 2002.

ITU-T, "Broadband Optical Access Systems Based on Passive Optical Networks (PON)", ITU-T Recommendation G.983.1, Oct. 1998.

"Telecommunication Networks" by M. Schwartz, Addison-Wesley, 1987, pp. 441-447.

* cited by examiner

METHODS AND APPARATUS FOR REMOVING BEAT INTERFERENCE FROM SPLITTERS/COMBINERS

CROSS-REFERENCE AND RELATED APPLICATIONS

This application is related to co-pending and co-owned U.S. patent application Ser. No. 14/061,008, entitled "COMMUNICATION MANAGEMENT IN AN OPTICAL NETWORK", filed Oct. 23, 2013, and issued as U.S. Pat. No. 9,491,528 on Nov. 8, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital data (e.g., text, video, and/or audio) over optical networks or any network utilizing optically-combined simultaneous transmissions from lasers of identical or nearly-identical wavelengths. Specifically, various methods and apparatus of the present disclosure are directed to removing beat interference from the splitting and/or combining of signals.

2. Description of Related Technology

Service providers, or more generally multiple system operators (MSOs), continually strive to increase the data capacity of their networks to increase revenue. Many MSOs have migrated to optical technologies by replacing the coax portion of existing Hybrid Fiber Coax (HFC) networks with a single-fiber Passive Optical Network (PON). Exemplary networks utilize different optical wavelengths in the downstream (e.g., to the consumer premises) and return-path directions (e.g., from the consumer premises). Typically, the optical networks use 1550 nm downstream, and 1310 nm or 1590/1610 nm upstream wavelengths. The 1590/1610 nm return path allows the fiber infrastructure to support both RFoG (Radio Frequency over Glass) and PONs simultaneously.

In conventional RFoG optical communication networks, so-called Optical Network Units (ONUs) are typically deployed at each of multiple customer premises locations. In a conventional RFoG network, a single strand of optical fiber is typically shared among multiple downstream ONUs (typically 32, but other numbers are possible). In the downstream direction, a light splitting resource divides downstream light power to the ONUs such that a portion of the downstream light power is transmitted to each ONU. Each of the ONUs receives light containing identical information in the downstream direction (from the cable network company to a corresponding subscriber customer). Typically, a signal analyzer analyzes the received signal to determine which data is directed to the corresponding subscriber. In certain instances, a portion of content encoded on a respective downstream optical signal can include data available for consumption by multiple subscribers.

For upstream transmissions (customer to company), each of the ONUs can include a respective laser transmitter that is manufactured to identical specifications. As such, the transmitters transmit on the same or nearly identical wavelength of light in the upstream direction to the company. When two downstream located laser transmitters transmit at the same time in an upstream direction, the optical receiver at the company side facility (such as at a cable modem termination system) receives optical power from both laser transmitters. An optical detection device in the upstream device converts the optical signal into a respective electrical output that is proportional to the instantaneous sum of the combined optical powers contributed by the two lasers. Since the wavelengths of these low-cost lasers (e.g., the upstream optical transmitters in the ONUs) are not precisely controlled, in most cases they are separated in the optical spectrum by a spacing that is sufficient to consider only the sum of the optical powers at the receiver output because there is a tolerance in the upstream wavelengths (per the RFoG specification) where 1310 nm can vary by +/−50 nm and 1610 nm can vary by +/−10 nm. So largely variability will not exceed those tolerances hence the conclusion that the wavelengths would be the sum of optical powers. If the RF (Radio Frequency) signals feeding the two ONUs are on different RF channels, both channels will appear in the electrical output generated by the upstream located receiver.

RFoG delivers the same services as HFC network, with the added benefit of improved noise performance and increased usable RF spectrum in both the downstream and return-path directions. Since both RFoG and HFC systems can concurrently operate out of the same headend/hub, service providers can leverage existing capital infrastructure. More generally, cable operators can continue to use existing provisioning and billing systems, Cable Modem Termination System (CMTS) platforms, headend equipment, set-top boxes, conditional access technology and cable modems.

However, RFoG does suffer from certain unusual interference effects. Specifically, in converting the RF signal to optical signaling, the RF channel separation is lost. Instead, the converted RFoG optical signaling is performed on substantially the same wavelength (accounting for imprecise manufacturing tolerances of low-cost lasers). When upstream signals from multiple lasers are combined in a passive splitting device (as is typically done in modern RFoG networks), so-called "beat frequency" effects may occur because the wavelengths are very close in frequency. Such interference can become severe to the point where no communication is possible until the event (collision) passes. More generally, "Optical Beat Interference" (OBI), is an issue with any point to multi-point optical system where the laser transmitters are nearly identical in wavelength, and where multiple transmitters may transmit simultaneously. OBI is well-documented in real-world RFoG systems.

Existing networks are unable to prevent OBI, and instead rely on the statistical rarity of collisions and collision resolution schemes. For example, when multiple lasers simultaneously (or nearly simultaneously) transmit, the resulting OBI will interfere with proper reception. Consequently, both transmitters back-off for a randomized time interval (similar to Carrier Sense Multiple Access with Collision Detection (CSMA/CD) schemes used in e.g., Ethernet applications) and retransmit thereafter. However, such solutions severely limit throughput in many common traffic scenarios and are thus undesirable. Additionally, retransmission cannot be used with certain types of protocols (e.g., User Datagram Protocol (UDP)).

Accordingly, improved apparatus and methods are needed to address the foregoing, including reducing or removing the effects of OBI in optical networks. More generally, various aspects of the present disclosure are broadly applicable to any interference effects which are the result of passive mixing (e.g., beat frequencies, parasitic noise, etc.)

SUMMARY

The present disclosure addresses the foregoing needs by providing, inter alia, various embodiments of methods and apparatus for removing beat interference from the splitting and/or combining of signals.

In a first aspect of the present disclosure, a method for removing beat interference from splitting and/or combining of signals is disclosed. In one embodiment, the method includes: receiving one or more signals via a wave-based communication signal; converting the one or more received signals to one or more intermediate format signals; combining the one or more intermediate format signals into an aggregate signal; converting the aggregate signal to a second wave-based communication signal; and transmitting the second wave-based communication signal.

In one variant, the wave-based communication signal includes an optical signal, and the one or more intermediate format signals include electrical signals. In one case, the received one or more signals are received via independent receivers. In another case, the received one or more signals are received via corresponding point-to-point connections.

In a second variant, the wave-based communication signal and the second wave-based communication signal are characterized by corresponding first and second transmission wavelengths. In one such case, the corresponding first and second transmission wavelengths are different.

In a third variant, the combining the one or more intermediate format signals includes a summation. In some variations, the summation further includes equalizing one or more signal strengths corresponding to the one or more intermediate format signals. In other variants, the summation further includes amplification or attenuation of at least one of one or more intermediate format signals.

In a fourth variant, the method additionally includes: receiving a downstream signal via a third wave-based communication signal; splitting the downstream signal into a plurality of fourth wave-based communication signals; and transmitting the plurality of fourth wave-based communication signals.

In a second aspect of the present disclosure, an active splitter/combiner apparatus is disclosed. In one exemplary embodiment the active splitter/combiner apparatus includes: at least one upstream port configured to transmit and receive optical signaling; one or more downstream ports configured to transmit and receive optical signaling; at least one electrical-to-optical converter configured to convert an aggregate upstream electrical signal to an aggregate upstream optical signal, the at least one electrical-to-optical converter coupled to the at least one upstream port; one or more optical-to-electrical converters configured to convert one or more upstream optical signals to corresponding electrical upstream signals; and an electrical combiner configured to generate the aggregate upstream electrical signals from the corresponding electrical upstream signals.

In one variant, the one or more downstream ports are configured to connect via a point-to-point connection to one or more optical network units (ONUs) corresponding to a customer premises equipment (CPE).

In another variant, the at least one upstream port is configured to connect via a point-to-point connection to a multi-port optical resource.

In still a third variant, the at least one upstream port and one or more downstream ports are configured to operate at optical wavelengths.

In a fourth variant, the optical signaling includes Radio Frequency over Glass (RFoG) signaling.

In a fifth variant, the apparatus further including an optical power splitter configured to split a downstream optical signal into a plurality of downstream copies.

In a third aspect of the present disclosure, a passive optical network system configured to remove optical beat interference is disclosed. In one embodiment the passive optical network system includes: a multi-port optical resource coupled via a first point-to-point optical connection to an active splitter/combiner; a plurality of optical network units (ONUs) coupled via a plurality of second point-to-point optical connections to the active splitter/combiner. In one exemplary embodiment, the active splitter/combiner is configured to: convert a plurality of optical signals into a plurality of electrical signals; combine the plurality of electrical signals into an aggregate electrical signal; convert the aggregate electrical signal to an aggregate optical signal; and transmit the aggregate optical signal.

In one variant, the passive optical network system is configured to support Radio Frequency over Glass (RFoG) signaling.

In a second variant, the combination of the plurality of electrical signals into an aggregate electrical signal includes a summation.

In a third variant, the plurality of ONUs can transmit concurrently without optical beat interference (OBI).

These and other features and advantages of the present disclosure will immediately be recognized by persons of ordinary skill in the art with reference to the attached drawings and detailed description of exemplary embodiments as given below.

Figure 1:
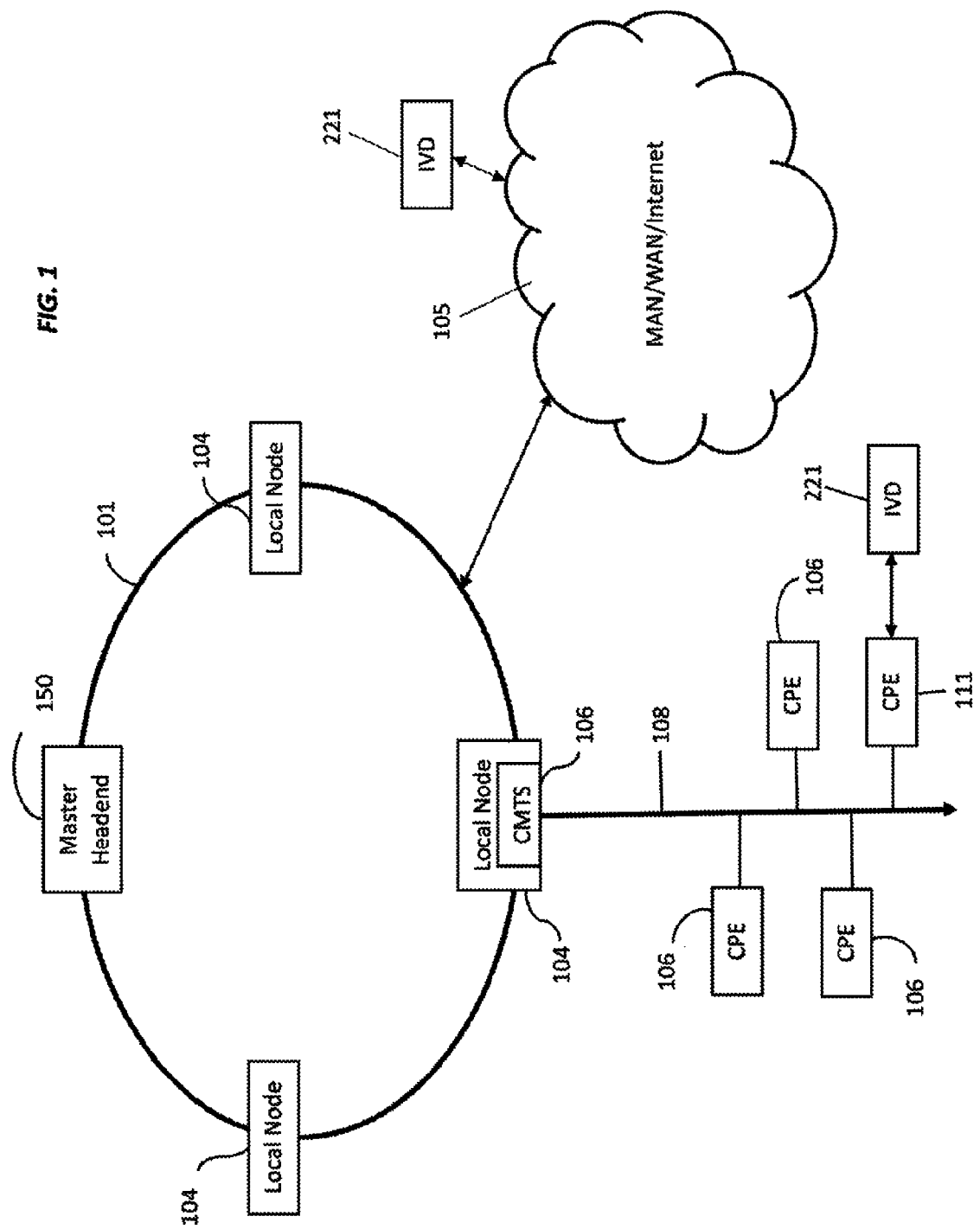
FIG. 1 is a functional block diagram illustrating an exemplary content distribution (e.g., cable) network configuration useful with the present disclosure.

All Figures © Copyright 2014 Time Warner Cable, Inc. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421 M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.). Binary Runtime Environment (e.g., BREW), and the like.

Similarly, the terms "Consumer Premises Equipment (CPE)" and "host device" refer without limitation to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), ITV Personal Computers, game consoles, and home digital media devices (e.g., Roku, Sonons, etc.).

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multimedia specific operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the terms "Internet" and "internet" are used interchangeably to refer to inter-networks including, without limitation, the Internet.

As used herein, the terms "IP" and "Internet Protocol" refer without limitation to any of the Internet protocols including e.g., IPv4 (RFC-791 (1981), et seq.), and IPv6 (RFC-2460 (1998), et seq.).

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3 GPP, 3 GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

Overview

In one aspect of the disclosure, methods and apparatus for removing beat interference from the splitting and/or combining of signals are disclosed. In one embodiment, the network environment is an optical network environment which is configured to transmit data signaling encoded as optical signals. In one exemplary embodiment, the optical network further includes elements of an RFoG (Radio Frequency over Glass) and/or a Passive Optical Network (PON). In one exemplary network topology, the network operator delivers downstream data content (from e.g., a cable modem termination system (CMTS)) via strands of optical fiber which are shared and split for delivery to customer premises via downstream Optical Network Units (ONUs). Similarly, upstream data content is transmitted from each customer premises for delivery to the network operator In one exemplary embodiment of the present disclosure, an active splitter/combiner is configured to receive one or more optical inputs, convert each optical input to an intermediary electrical signal, combine the intermediary electrical signals, and generate a resultant optical output. Specifically, an optical splitter/combiner is configured to receive the upstream signals from multiple customer lasers, and separate any downstream signals. Each upstream signal is processed by an independent optical receiver and demodulator. The resulting electrical signals are combined using conventional means and then applied as a modulating signal to a laser to generate a resultant output. Thereafter, the result is re-combined with the downstream signals. In some variants, the separated downstream signals are further split using conventional optical power splitters before being re-combined with the resultant output.

Those of ordinary skill in the related arts will readily appreciate that the various described embodiments readily coexist with existing optical network technologies. For example, combining and de-combining may utilize existing circulators, optical filters, etc. Moreover, wavelengths for PON, Ethernet PON (EPON), etc. may be included in the downstream signals (via filters), or separately routed to another splitting devices.

Various aspects of the present disclosure are directed to optical networks that utilize optically-combined simultaneous transmissions from lasers of near identical wavelengths. More generally, the principles described herein are broadly applicable to any network which experiences interference artifacts as a result of passive splitting and/or combining.

Detailed Description of Exemplary Embodiments

Exemplary embodiments of the apparatus and methods of the present disclosure are now described in detail. While these exemplary embodiments are described in the context of the previously mentioned hybrid fiber coax (HFC) cable architecture and associated optical networking infrastructure, the general principles and advantages of the disclosure may be extended to other types of networks and architectures. Such other networks or architectures may be broadband, narrowband, wired or wireless, content or data, managed or unmanaged, or otherwise. Hence, the following description is merely exemplary in nature. For example, various aspects of the disclosure may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Network-Side Architecture—

Referring now to FIG. 1, an exemplary data-over-cable (DOCSIS) network 101, including broadcast IP (e.g., IPTV) service, is shown. As can be appreciated, this network 101 may comprise merely a portion of a larger content distribution network architecture, such as for example a cable delivery network.

Figure 1A:
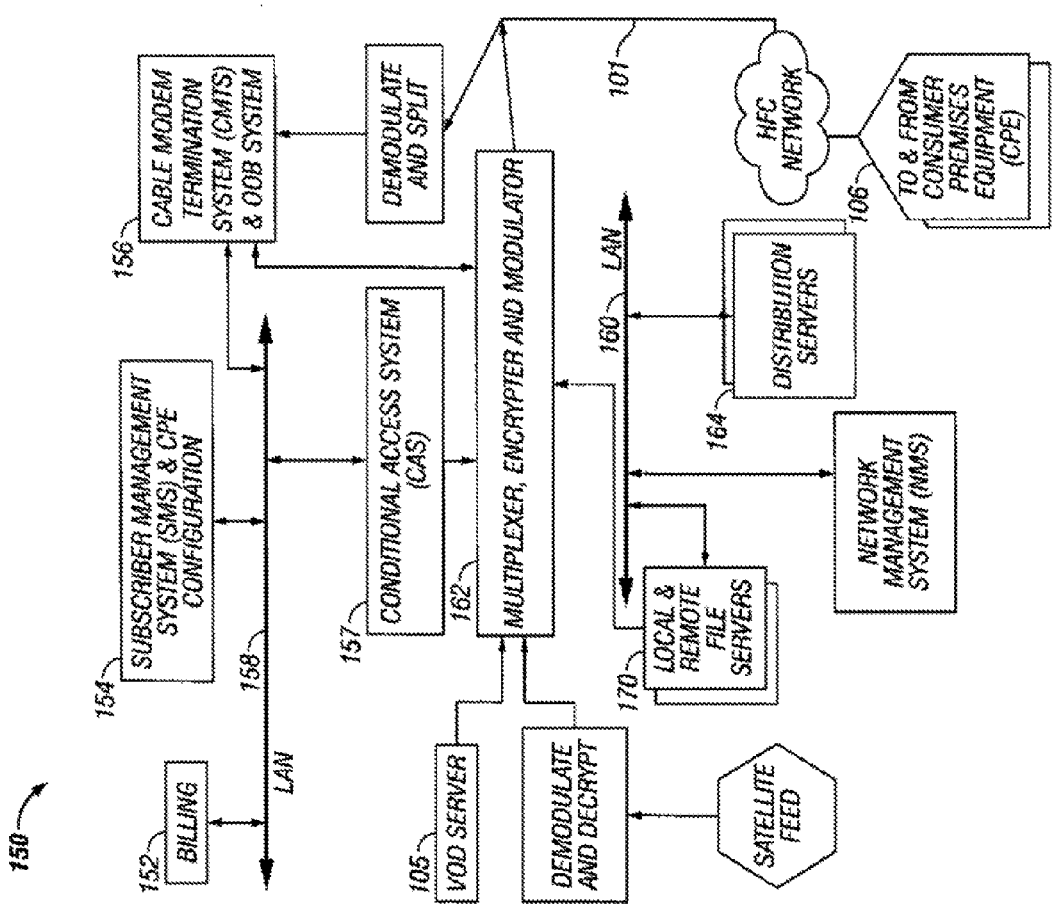
FIG. 1A is a functional block diagram illustrating one exemplary Hybrid Fiber Coaxial (HFC) cable network head-end configuration useful with the present disclosure.

A "master" headend 150 is connected with one or more local nodes 104 via a network 101. The network 101 could for example comprise an optical fiber network of the type known in the art using dense wave-division multiplexing (DWDM), Synchronous Optical Network (SONET) transport technology or gigabit Ethernet transport. In the downstream direction (from the headend servers or nodes to the CPE 106), this network performs the function of carrying digital and analog television signals as well as packetized data (e.g., IP) traffic. A cable modem termination system (CMTS) 156 located at a local node 104 provides connectivity to the CPE 106 via the coaxial drop 108. However it is appreciated that the CMTS 156 may alternatively be located at the master headend 150 (as illustrated in FIG. 1A below). A cable modem (CM) 111 is used to interface with the CMTS 156 to provide DOCSIS connectivity for any premises IP video devices (IVDs) 221, such as PCs, IP-enabled televisions, or the like. The CMTS interfaces 156 in turn are connected directly or indirectly to the Internet or IP backbone (e.g., a MAN, WAN, or internet 105), thereby providing access for the CPE 106 to the Internet (or other internets, intranets, or networks) via the cable network infrastructure. Alternatively or in tandem, the headend 150 is connected to one or more such outside networks (not shown), thereby providing connectivity for the CPE 106 and headend components.

Aggregation of content such as television programs that include local and regional programming, or other types of content, occurs at the headend 150, where these programs are converted into a suitable transport fotrnat and a "channel line-up" is created for delivery to the downstream CPE 106.

Referring now to FIG. 1A, one exemplary embodiment of a general headend architecture useful with the present disclosure is described. As shown in FIG. 1A, the headend architecture 150 comprises typical headend components and services including billing module 152, subscriber management system (SMS) and CPE configuration management module 154, and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. The headend architecture 150 may also include the CMTS 156 if desired.

It will also be appreciated that the headend configuration depicted in FIG. 1A is high-level, conceptual architecture and that each MSO may have multiple headends deployed using custom architectures.

The architecture 150 of FIG. 1A further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the disclosure is in no way limited to these exemplary approaches.

It will be noted with respect to FIGS. 1-1A, the CPE 106 is intended to include without limitation both legacy devices 106A (such as traditional settop boxes) as well as IP video devices (IVDs) 106B. A legacy device in the present context is a CPE 106A which is not IP enabled, but rather receives video stream from an RF or other such connection. An IVD 106B (described in greater detail subsequently herein) comprises a device which receives video streams via an IP-based transport (which may or may not be fiber/RF/coaxial connection; e.g., IP-over-DOCSIS, or over a CAT-5 TSP cable, wireless interface, etc.). These different types of devices may be hereinafter referred to collectively as "client devices".

Existing Passive Optical Network—

Figure 2:
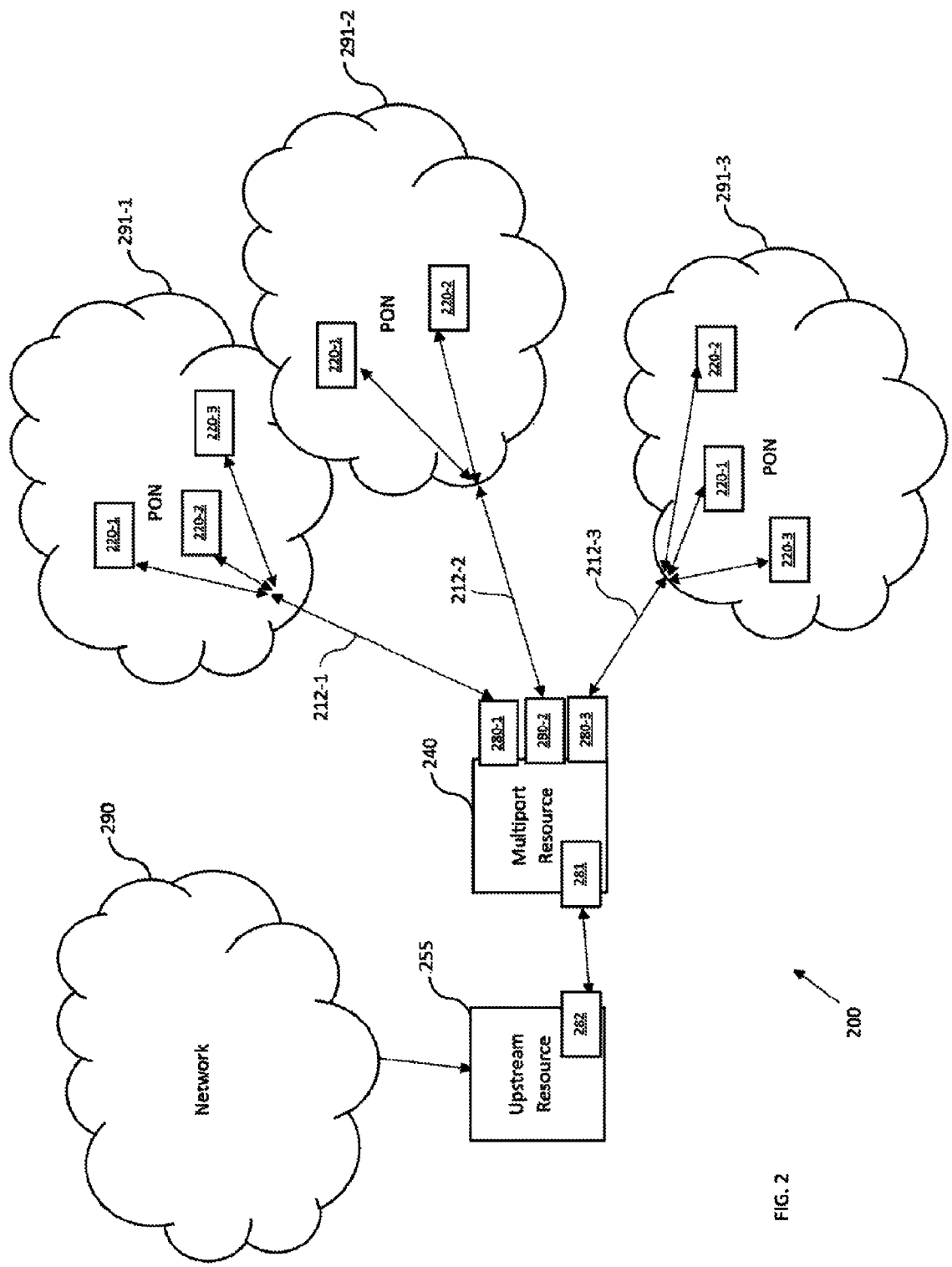
FIG. 2 is an exemplary logical block diagram of prior art Passive Optical Networks (PONs) of a HFC cable network.

FIG. 2 is an exemplary diagram of one prior art optical network 200 of the HFC network. An upstream resource (e.g., the MEM 162 of FIG. 1A) is connected to a multi-port optical resource 240 which services a number of passive optical networks. As shown, the exemplary optical network environment 200 (such as a cable network environment) includes passive optical network 291-1, passive optical network 291-2, passive optical network 291-3, and so on. Each of the passive optical networks 291 includes a corresponding set of communication resources (i.e., client devices such as cable modems, set-top boxes, server resources, etc.).

In one embodiment, each of multiple subscriber domains in a network environment includes one or more communication resources to facilitate retrieval and transmission of data in a cable network environment. In this non-limiting example embodiment, passive optical network 291-1 includes communication resource 220-1, communication resource 220-2, and communication resource 220-3; passive optical network 291-2 includes communication resource 221-1 and communication resource 221-2; passive optical network 291-3 includes communication resource 222-1, communication resource 222-2, and communication resource 222-3. Accordingly, groupings of communication resources (such as client devices) reside in different passive optical networks.

Each of the passive optical networks 291 is communicatively coupled to a respective port of multi-port optical resource 240 via a respective shared communication link. For example, passive optical network 291-1 is communicatively coupled to port 280-1 of multi-port optical resource 240 via communication link 212-1 (such as a first shared communication link); passive optical network 291-2 is communicatively coupled to port 280-2 of multi-port optical resource 240 via communication link 212-2 (such as a second shared communication link); passive optical network 291-3 is communicatively coupled to port 280-3 of multi-port optical resource 240 via communication link 212-3 (such as a third shared communication link); and so on.

Each of the communication links 212 (such as communication link 212-1, communication link 212-2, and communication link 212-3) can be any suitable optical carrier medium such as a fiber optic link. Each of the communication resources can be configured to include an optical transmitter to communicate upstream to the multi-port optical resource 240. In one embodiment, each of the communication resources in a respective passive optical network transmits in the upstream direction to multi-port optical resource 240 at a substantially similar or same wavelength such as 1310 nm or 1590/1610 nanometers (nm) or other suitable wavelengths.

Multi-port optical resource 240 receives the upstream optical communications from the multiple communication resources transmitted over the communication links 212 and through the multiple ports 280. For example, port 280-1 of the multi-port optical resource 240 receives upstream optical communications from a first grouping of client devices (e.g., communication resources 220) residing in passive optical network 291-1; port 280-2 of the multi-port optical resource 240 receives upstream optical communications from a second grouping of client devices (e.g., communication resources 221) residing in passive optical network 291-2; and so on.

For efficiency reasons, and to provide increased upstream throughput of data from the communication resources, multi-port optical resource 240 can be configured to combine communications received from the communication resources into a single RF signal. The multi-port optical resource 240-1 transmits the output signal from port 281 over a communication link to port 282 of the upstream resource 255. The upstream resource 255 receives the signal (including communications from the communication resources in different passive optical networks 291) from multi-port optical resource 240 and, where appropriate, facilitates further transmission of communications received from the communication resources over a communication link to appropriate one or more destinations in network 290. In other words, in certain instances, the upstream resource 255 further transmits communications to appropriate destinations in network 290.

In a reverse direction, the upstream resource 255 can be configured to facilitate transmission of data in a downstream direction to multi-port optical resource 240. For example, upstream resource 255 can be configured to generate a respective RF signal including content directed to communication resources in respective passive optical networks 291. The multi-port optical resource 240 converts the RF signal into one or more respective downstream optical signal transmitted to the communication resources over the respective communication links 212. Communication resources receive and process the received optical signal to retrieve data directed to the respective communication resources. A respective communication resource can ignore certain downstream-transmitted data such as data not including a network address of the respective communication resource.

Referring back to the communication links 212 (such as communication link 212-1, communication link 212-2, and communication link 212-3) each of the communication resources can include a respective optical transmitter fabricated to transmit at a substantially same wavelength of light. As previously alluded to, existing PONs which directly connect each of the communication resources in an upstream direction to the multi-port optical resource 240 is prone to experience optical beat interference.

Apparatus—

Figure 3:
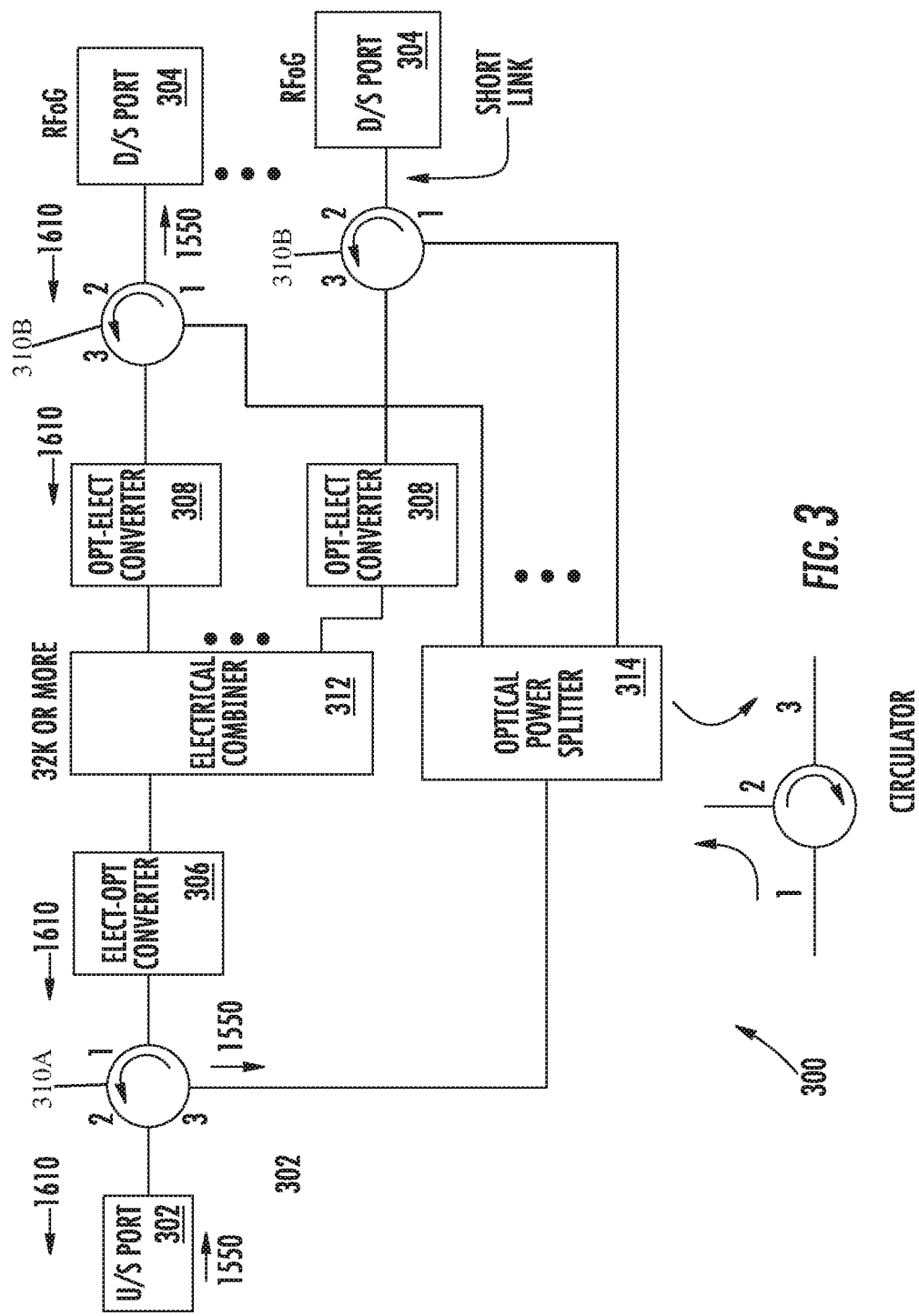
FIG. 3 is a logical block diagram of one exemplary active splitter/combiner apparatus in accordance with the present disclosure.

FIG. 3 illustrates one exemplary active splitter/combiner apparatus 300 in accordance with the principles described herein. In the illustrated embodiment, the exemplary active splitter/combiner apparatus 300 includes an upstream port 302, one or more downstream ports 304, an electrical-to-optical converter 306, one or more optical-to-electrical converters 308, one or more optical circulators 310, an electrical combiner element 312, and an optical power splitter 314. Those of ordinary skill in the related arts will readily appreciate that other constituent components may be present within the exemplary active splitter/combiner apparatus 300, the foregoing being purely illustrative.

As shown the upstream ports 302 and downstream ports 304 are each configured to couple to optical fiber. The upstream port 302 is configured to receive an optical fiber from an upstream device (such as the multi-port optical resource 240 which transmits and/or receives RF content to/from the upstream resource 255 of FIG. 2). In one exemplary embodiment, each downstream port 304 is configured to directly connect to a downstream device (such as a communication resources 220 of FIG. 2) in a point-to-point link. In one exemplary deployment, the active splitter/combiner apparatus 300 is deployed in a field-hardened and powered enclosure at a location where a conventional RFoG passive optical splitter would be used, such as in or near a cluster of homes. In other deployments, the active splitter/combiner may be deployed as part of a larger institutional information technology installation (e.g., to service a Multiple Dwelling Unit (MDU), corporate, university, etc.).

As will be described in greater detail hereinafter, one tangible benefit of such deployments is that the upstream reach capability of the active splitter/combiner 300 is greater than passive splitter/combiners since the active splitter/combiner 300 uses its own final upstream laser (rather than passively combining the outputs of the lasers from each of the premises). A farther upstream reach can enable a larger geographic distribution of optical networks which can further reduce network operator expenditures.

In one exemplary embodiment, the electrical-to-optical converters 306 are configured to convert an electrical signal to light via direct modulation. In one common implementation, the electrical-to-optical converter 306 includes a laser diode that is configured to emit laser light as a function of a bias current relative to a quiescent point of the laser diode, where the bias current is driven by the electrical signal. During operation, the electrical signal modulates the laser diode bias current about the optimal DC (Direct Current) quiescent point. The resulting emitted light (at the appropriate wavelength) is produced at an intensity (power) that is proportional to the modulated electrical signal. Thereafter, the resultant modulated laser light can be transmitted via the optical fiber.

In one exemplary embodiment, the optical-to-electrical converters 308 are configured to convert a light signal to an electrical signal. In one exemplary implementation, the optical-to-electrical converter includes a photodiode that operates as a current source in response to incident light within a particular wavelength range. During operation, the output current changes linearly with incident power of the light signal. More directly, the current produced by the photodiode is linearly proportional to the power of the received optical signal. The resulting current can be translated to an appropriate voltage representation via e.g., a resistor, or other mechanisms widely appreciated within the relevant arts.

Within the context of Radio Frequency over Glass (RFoG), the laser light is modulated according to an RF carrier signal (in the electrical domain), and vice versa; in other words, the optical signaling is a carrier of the RF signaling. While the foregoing scheme is discussed primarily with reference to RFoG, it is readily appreciated that the various principles may be used with any form of communication (electromagnetic or otherwise) layered over the optical networks, the foregoing being purely illustrative.

As shown in FIG. 3, each optical circulator 310 has three (3) ports. An optical circulator is configured to selectively pass light between its ports based on a sequence of e.g., polarizations, rotations, and shifts, etc. In one exemplary embodiment, each circulator is configured to pass light originating from a first port to a second port, but not to the third port. Light originating from the second port is passed to the third port, but not the first port. While the disclosed optical circulators are based on a three (3) port device having a specific circulation configuration, it is appreciated that an optical circulator with a greater number of ports and/or different circulation configurations may be substituted with equal success so as to e.g., enable other network topologies and/or provide further enhancements (e.g., supporting other optical technologies).

Additionally, while the present disclosure uses an optical circulator to direct light, it is appreciated that other schemes for separation and routing of upstream and downstream optical signaling may be used with equal success, given the contents of the present disclosure. For example, the present scheme may be implemented with e.g., optical filters, etc. Common filters may be configured to pass or block wavelengths or ranges of wavelengths. Depending on the nature of the wavelength that is passed/blocked, the filter may be e.g., long-pass (passes wavelengths above a cut-off wavelength), short-pass (passes wavelengths below a cut-off wavelength), band-pass (passes only wavelengths within a range), notch-pass (blocks only wavelengths within a range), etc. For example, optical filters may be used to separate uplink and downlink traffic based on e.g., their different wavelengths (e.g., 1550 nm downstream, and 1310 nm or 1590/1610 nm upstream wavelengths).

Referring back to FIG. 3, in one exemplary embodiment, the electrical combiner element 312 is configured to combine each received electrical input together to form an aggregated electrical output. In one exemplary embodiment, the electrical combiner includes a summing amplifier configured to sum the received signals. In some variants, the electrical combiner may perform some initial gain compensation (e.g., to account for differences in incident power, etc.). In complex variants, the electrical combiner may dynamically adjust sensitivity/gain associated with each received signal indirectly based on received signal strength, reported bit error rates (BER), etc.

The optical power splitter 314 is configured to receive an optical input signal and passively split the optical power over a number of output taps. In one variant, the resulting output is proportionately decreased in power. For example a 1:32 power splitter will provide 32 output signals, each at 1/32 the input signal power. Alternative variants may unevenly allocate power statically or dynamically so as to e.g., support asymmetric networks (e.g., where one tap must traverse a longer distance than the others, etc.), improve performance of a particular link, etc. Those of ordinary skill in the related arts will readily appreciate that active variants may additionally provide signal conditioning and/or increase signal power.

During operation, the upstream port 302 receives a downlink optical signal at 1550 nm from an upstream device (such as the multi-port optical resource 240 which generates the downlink optical signal based on RF content received from the upstream resource 255 of FIG. 2), and each downstream port 304 receives an uplink optical signal from its corresponding communication resource (e.g., an Optical Network Unit (ONU) associated with a Consumer Premises Equipment (CPE)) at 1610 nm. Each of these links is a direct point-to-point optical link, thus for each link there is no more than one transmitter on any wavelength at any time.

In the uplink direction, each downstream port 304 of the apparatus 300 receives an upstream optical signal and passes it via optical circulators 310B to an optical-to-electrical converter 308. The optical-to-electrical converter 308 converts the upstream optical signals to the electrical domain, for processing by the electrical combiner element 312. The resulting aggregate electrical uplink signal is converted back to the optical domain via the electrical-to-optical converter 306. The upstream optical signal is passed via the optical circulator 310A to the upstream port 302 for transmission upstream. The optical circulator 310A prevents the transmission of the upstream optical signal to the optical power splitter 314.

As shown, the downlink optical signal is directed via the first optical circulator 310A to the optical power splitter 314. The optical power splitter 314 splits the downlink optical signal so as to provide each downstream port 304 with a separate "copy" of the downlink optical signal (albeit at reduced power). The optical circulators 310B ensure that the downlink optical signals are not provided to the electrical combiner element 312.

Those of ordinary skill in the related arts will readily appreciate that the active splitter/combiner apparatus 300 does not suffer from any Optical Beat Interference (OBI) effects. As previously noted, OBI is an interference between two similar wavelengths of light. Each upstream signal is a separately modulated at distinct light sources. OBI occurs when the upstream signals are combined in a passive optical combiner (as used in a passive optical network) when the wavelength difference between the light sources is less than a critical amount. In other words, OBI is generated between the optical carrier waves (e.g., the wavelengths), and not as a function of the modulated signals themselves. Accordingly, by converting each separately modulated carrier light wave (which have a characteristic wavelength) to an electrical current or voltage prior to combining the signals, the electrical signals can be summed without generating OBI effects. While the foregoing solution is primarily envisioned within the linear, optical and electrical domains, it is readily accepted that other conversions where the modulation is not continuous (e.g., ON-OFF digital modulation), or any similar modulation type can benefit from the principles described herein; e.g., where information-carrying optical waves of similar wavelength must be combined. For example, conversion from optical to e.g., digital, analog, or some hybrid representation thereof (e.g., Pulse Width Modulation (PWM), Pulse Density Modulation (PDM), QAM, OFDM, Wavelet, etc.) would be feasible. For example, it is readily appreciated by those of ordinary skill in the related arts, given the contents of the present disclosure, that the incident optical signals may be converted to digital representations, processed digitally, combined in the electrical domain, and then reconstituted into an optical signal carrying a combined information payload.

While the foregoing discussion is primarily described with respect to a static or fixed configuration, it is readily acknowledged that various aspects of the present disclosure may be further improved by incorporating dynamic management capabilities. To these ends, certain embodiments of the present disclosure may additionally incorporate one or more processors and non-transitory computer readable media. In such variants, the non-transitory computer readable media may include one or more instructions which when executed by the processors is configured to cause the processor to perform a variety of functions including without limitation: configuration of the network based on input received from a network operator, monitoring network performance, traffic control, and/or identification of network issues.

For example, in some embodiments the processor may be configured to cause the active splitter/combiner apparatus 300 to increase/decrease the intensity of the electrical uplink and/or downlink signals corresponding to any ones of the communication resources. Those of ordinary skill in the related arts, given the contents of the present disclosure, will recognize that the intensity (power) of the optical uplink signal received from the communication resource degrades as a function of the relative distance between the communication resource and the active splitter/combiner apparatus. For example, an ONU which is farther from the active splitter/combiner apparatus will experience larger attenuations in optical intensity than a closer ONU. By accentuating, or diminishing the received inputs from each of the communication resources, the active splitter/combiner apparatus can change the "apparent" distance between the upstream device and the communication resource. As those of ordinary skill in the related arts will readily appreciate, significant amplification of the intensity of a received upstream optical signal can enable much greater distances than traditional PONs could support.

While amplification of the received inputs provides some benefit, there are drawbacks as well. Optical transmitters and receivers have practical power limitations, and in some cases can fail to operate (or be damaged) by excessive power. Accordingly, certain embodiments may adjust power so as to optimize operation within those constraints. For example, in one such case operation ensures that the signaling received from each of the communication resources is approximately equivalent (so as to provide e.g., uniformity of service). As a brief aside, the electrical combiner element 314 is configured to directly combine (sum) the received electrical uplink signals. If one or more of the electrical signals is of substantially higher power than the other signals, then the resulting output may be disproportionately dominated by the higher power signal. For similar reasons, the optical power splitter 312 may have power limitations and/or optical amplification limitations. Accordingly, variants of the present disclosure are configured to automatically equalize the power corresponding to each of the communication resources. Alternatively, certain embodiments may be configured to preferentially "boost" inputs from certain communication resources so as to e.g., provide more robust signaling, etc.

In a related variation, it is readily appreciated that certain network technologies may need to calibrate and/or train their link transceivers. It is readily appreciated that in existing PON type networks, the upstream device may be required to train the communication resources based on their relative distance (or vice versa). However, the intermediary presence of the active splitter/combiner may frustrate calibration efforts between the communication resource and the upstream device, as neither entity will have an accurate view of the actual optical link losses. Accordingly, in one embodiment, the processor is configured to respond to link training with the upstream device, and additionally to independently diagnose and train links to the communication resources. For example, in one training sequence, the upstream device trains the link between itself and the active splitter/combiner based on e.g., a test pattern, monitored BER of live data, etc. Once the link between the upstream device and the active splitter/combiner is properly calibrated, the active splitter/combiner can train each link between itself and its serviced communication resources. Once the active splitter/combiner has successfully concluded calibration, the active splitter/combiner reports the calibration results to the upstream device (or other network management entity).

In some embodiments, the active splitter/combiner may be configured to provide diagnostic information to the upstream device. Generally, it is appreciated that the uplink and downlink cabling losses are roughly symmetric. Since the active splitter/combiner apparatus is connected via point-to-point linkages to each of its serviced communication resources, performance degradation that is specific to a particular communication resource can be quickly identified by e.g., sniffing uplink traffic, etc. The ability to quickly pinpoint link issues enables network service technicians to efficiently resolve potential connectivity issues (e.g., problems with cabling etc.)

In some embodiments, the active splitter/combiner may be further configured to correct link issues. For example, in one such variant, the active splitter/combiner recognizes an issue with one or multiple of the incoming optical signals (such as a failure to mute or inadequate quieting (when required by a TDMA (Time Division Multiple Access) optical system), a transmission of an erroneous or interfering modulated content, other undesirable optical signal behaviors, etc.) Responsively, the active/splitter combiner is configured to disable and/or modify the signal issue such that it no longer prevents or degrades reception of other desired incoming signals.

Still other improvements and configurations enabled by incorporating dynamic management capabilities will be made readily apparent to those of ordinary skill in the related arts, given the contents of the present disclosure.

Exemplary Passive Optical Network—

Figure 4:
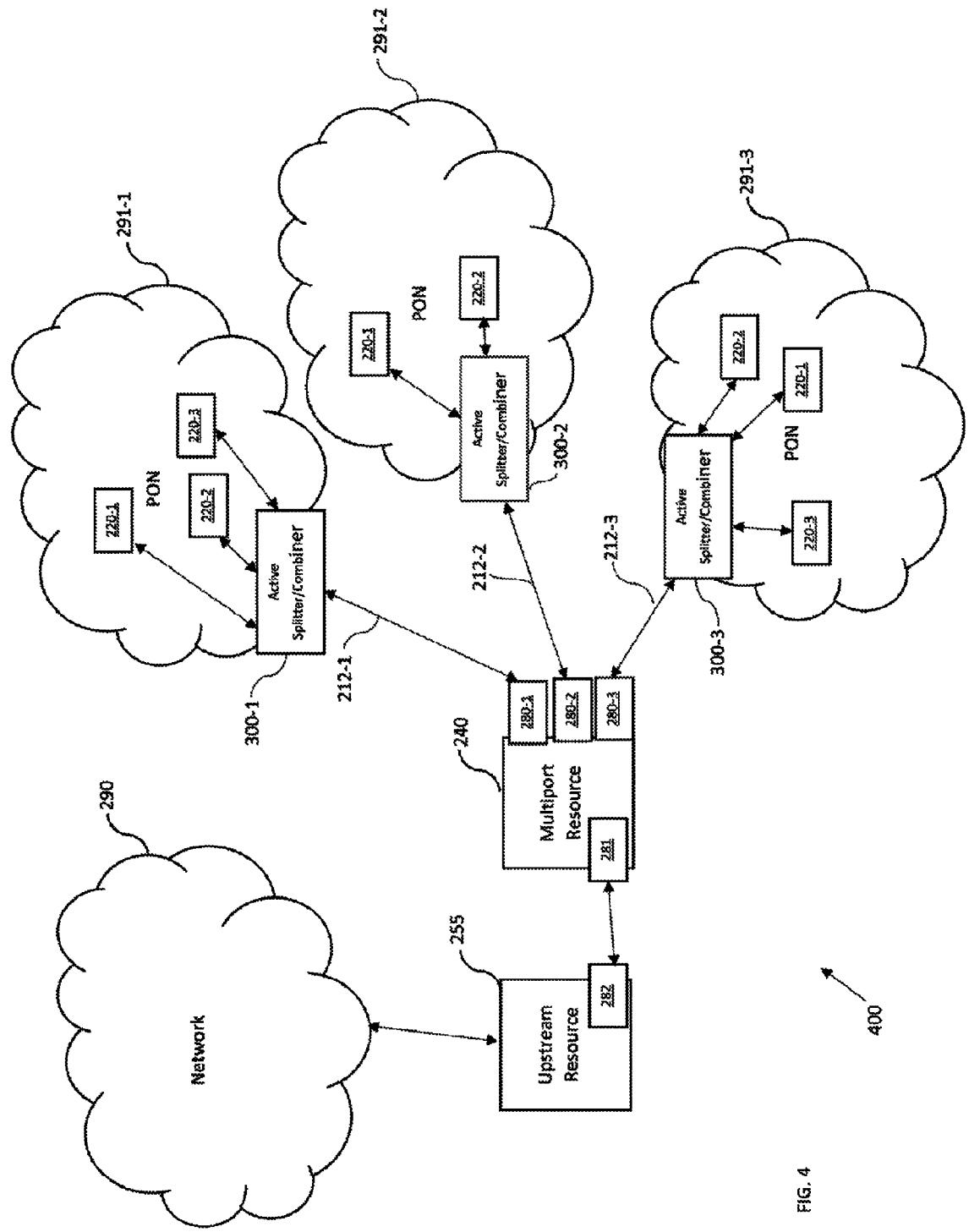
FIG. 4 is a logical block diagram of one optical network of the HFC cable network configured for use with the exemplary active splitter/combiner apparatus in accordance with the present disclosure.

In contrast to the prior art network of FIG. 2, FIG. 4 illustrates one exemplary network which incorporates the active splitter/combiners 300 of the present disclosure. Specifically, as shown, instead of passively splitting/combining the optical fiber as a shared communication link, each communication resource is directly connected to an active splitter/combiner 300, which actively splits the downstream transmissions and combines the upstream transmissions. For example, passive optical network 291-1 is communicatively coupled to active splitter/combiner 300-1, which is coupled to port 280-1 of the multi-port optical resource 240 via communication link 212-1. Similarly, passive optical network 291-2 is communicatively coupled to active splitter/combiner 300-2, which is coupled to port 280-2 of multi-port optical resource 240 via communication link 212-2; passive optical network 291-3 is communicatively coupled to active splitter/combiner 300-3, which is coupled to port 280-3 of multi-port optical resource 240 via communication link 212-3; and so on.

In one variant, each active splitter/combiner 300 is configured to service up to 32 communication resources. Typical deployments may be implemented in a hardened and powered enclosure that is connected to e.g., a small neighborhood, residential or corporate network. Still other installations may be more localized, such as within a utility closet or server room, for apartments, condominiums, or other multiple dwelling units.

As with existing networks the multi-port optical resource 240 can be configured to combine communications received from the communication resources into a single RF signal. The multi-port optical resource is coupled to the upstream resource 255. The upstream resource 255 receives the signal (including communications from the communication resources in different passive optical networks 291) from multi-port optical resource 240 and, where appropriate, facilitates further transmission of communications received from the communication resources over communication link to appropriate one or more destinations in network 290. In a reverse direction, the upstream resource 255 is configured to facilitate transmission of data in a downstream direction to multi-port optical resource 240. The multi-port optical resource 240 converts the RF signal into one or more respective downstream optical signal transmitted to the communication resources over the respective communication links 212. Communication resources receive and process the received optical signal to retrieve data directed to the respective communication resources.

In one preferred embodiment, the operation of the active splitter/combiner 300 is transparent to the other entities of the network, and is otherwise indistinguishable from a passive splitter. In other embodiments, the active splitter/combiner 300 may be addressable as a logical node of the network by either the network operator and/or the communications resources. In such configurations the active splitter/combiner 300 may be able to identify itself (and its capabilities, configuration, etc.), and/or communicate information with regard to network conditions, etc. In some cases, the active splitter/combiner 300 may additionally be able to insert its own communications feed into the split/combined stream. For example, the active/splitter combiner 300 may be allocated an RF channel, and modulate/demodulate the allocated RF channel in the electrical signaling domain. Alternatively, the active splitter/combiner 300 may have an external out-of-band network interface for communication (e.g. an external Ethernet connection, etc.). Still other means for access to the active splitter/combiner 300 will be readily appreciated by those of ordinary skill in the related arts, given the contents of the present disclosure.

Methods—

Figure 5:
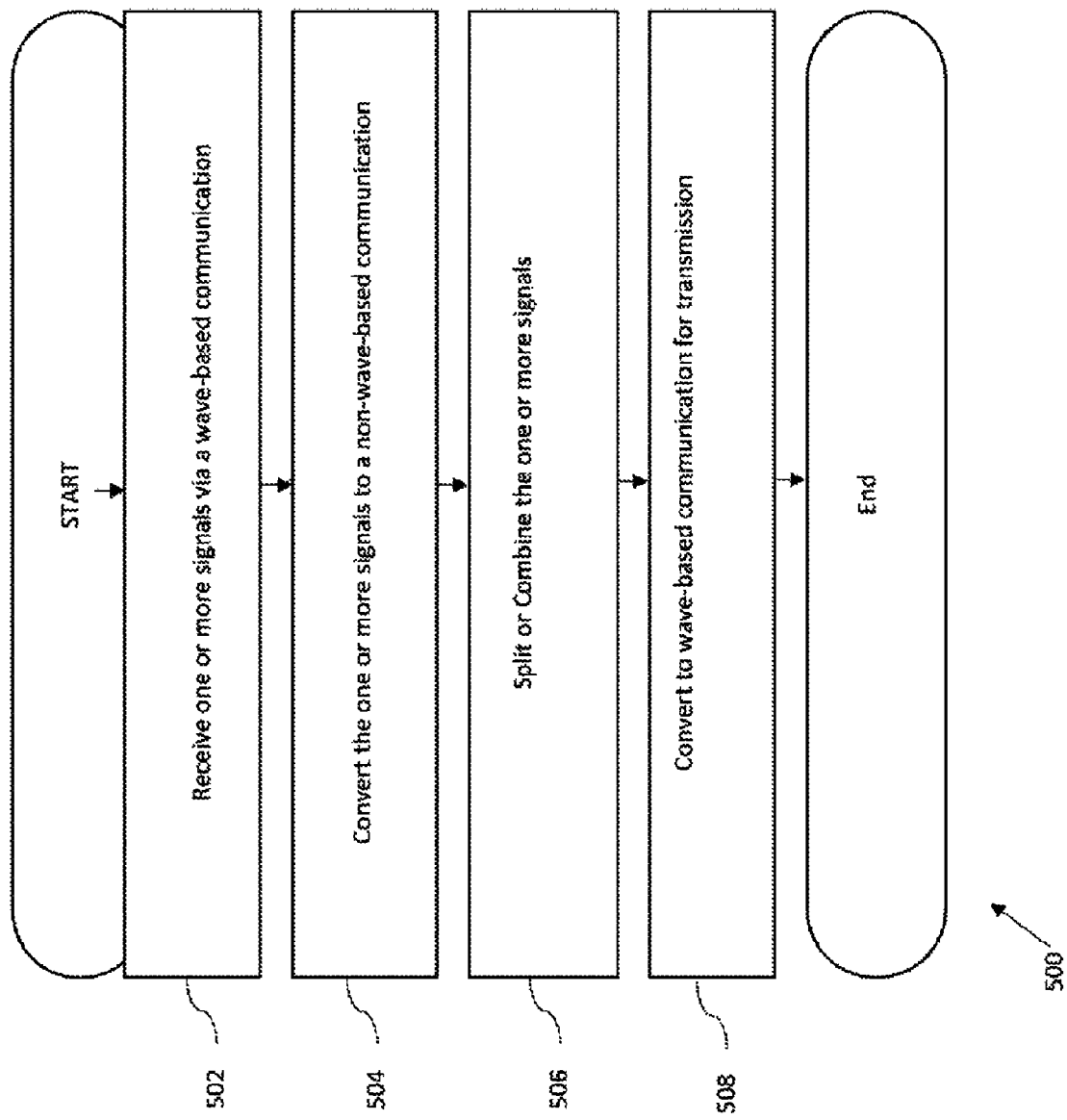
FIG. 5 is a logical flow diagram of one generalized method for removing beat interference from the splitting and/or combining of signals.

FIG. 5 illustrates one generalized method 500 for removing beat interference from the splitting and/or combining of signals.

At step 502 of the method 500, one or more signals are received via a carrier wave-based communication via a corresponding one or more of receivers.

Common examples of carrier wave-based communications include without limitation: radio communication, optical communication, acoustic communication, and/or hybrids thereof. More generally those of ordinary skill in the related arts will readily appreciate that the various principles described herein are broadly applicable to any types of communication which by their characteristic nature are performed via wave, wavelet (e.g., an oscillation which begins at zero, increases, and then decreases back to zero), or a plurality of waves and/or wavelets.

The one or more signals may be modulated over the wave according to a digital or analog representation. Common examples of modulation include without limitation: Binary Phase Shift Keying (BPSK), Quadrature Phase Shift Keying (QPSK), Quadrature and Amplitude Modulation (QAM e.g., 16-QAM, 32-QAM, 64-QAM, 128-QAM, 256-QAM, etc.). Less common examples include without limitation: Pulse Width Modulation (PWM), Pulse Density Modulation (PDM), On-Off-Shift-Keying (OOSK), etc. Still other modulation schemes will be readily appreciated by those of ordinary skill in the related arts.

In one exemplary embodiment, the one or more signals are modulated via another carrier wave-based communication. For example, the one or more signals may be modulated for transmission according to an RF carrier, which is itself, modulated for transmission via a light carrier wave suitable for transmission via a PON.

In one exemplary embodiment, each signal is received via a point-to-point link. More generally each wave-based signal is received in isolation from one another so as to prevent wave-to-wave interferences. As previously alluded to, within the context of waves, a "beat" is present when two or more waves of substantially similar wavelength are simultaneously received; when the waves are linearly superimposed, they do not perfectly align, but instead alternate between a constructive interference and destructive interference effect (or a "waxing and waning"). Within the optical domain, OBI creates distorting effects which can affect reception.

Other common examples of wave-to-wave interferences include any manner of unwanted constructive interference, destructive interference, beat effects, etc. While the disclosed embodiments are primarily discussed within the context of point-to-point links, it is further appreciated that any scheme which effectively isolates wave-based signals from one another would be suitable. Separation may be performed in time, frequency, wavelength, and/or spatially. For example, in one such case a plurality of receivers may each further receive time multiplexed optical signaling (e.g., where the users corresponding to each receiver communicate according to designated timeslots), so as to support even larger populations of communications resources.

In some embodiments, additional signal conditioning and/or filtering may need to be performed to isolate a signal of interest. Common examples of signal conditioning include without limitation: amplification, attenuation, polarization, filtration, etc. Those of ordinary skill in the related arts will readily appreciate that filtering may include any combination of filter elements which are configured to provide e.g., low-pass, high-pass, long-pass, short-pass, band-pass, notch-pass, infinite impulse response (IIR), finite impulse response (FIR), etc.

At step 504 of the method 500, the one or more signals are converted to an intermediate format. The intermediate format is selected to have different physical characteristics than the carrier wave-based communication format. In one exemplary embodiment, the intermediate format is an RFoG electrical signaling domain. Common examples of physical characteristics include e.g., physical carrier wave media (optical, electrical, mechanical), wavelength, frequency, etc. Common examples of intermediate format-based communications include without limitation: level-based (e.g., scalar), transition-based, width-based, timing-based, digital, etc.

In one embodiment, the conversion is from an optical intensity (power) to an electrical current. In one exemplary embodiment, the optical-to-electrical conversion is performed with a photodiode that operates as a current source in response to incident light within a particular wavelength range. In other embodiments, the optical intensity may be translated to a digital representation via e.g., one or more analog-to-digital (A/D) conversion steps. For embodiments where optical signaling is based on discrete signaling levels (e.g., according to Pulse Width Modulation (PWM), Pulse Density Modulation (PDM), On-Off-Shift-Keying (OOSK), etc.), the optical-to-electrical conversion may be presented as a digital signal.

Those of ordinary skill in the related arts will readily appreciate that the concepts described herein apply to any mechanical or electrical wave signaling. As a brief aside, those of ordinary skill in the related arts will readily appreciate that there are two main types of waves: mechanical and electromagnetic. Mechanical waves propagate by deforming a mechanical medium; the medium has intrinsic restorative forces resulting from its deformation which result in subsequent oscillation and transfer of the wave energy. For example, sound waves propagate as a function of air molecules colliding with their neighbor molecules. When air molecules bounce away from each other (an inherent restoring force), the wave energy is transferred to the neighbor molecules. In contrast, electromagnetic waves consist of periodic oscillations of electrical and magnetic fields, and may propagate via a medium but do not require a medium. In fact electromagnetic waves can travel through a vacuum. Electromagnetic waves vary in wavelength, and include without limitation radio waves, microwaves, infrared radiation, visible light, ultraviolet radiation, X-rays, and gamma rays.

By converting a carrier wave-based communications systems to another intermediate format domain, the various embodiments of the present disclosure remove the tangential effects of wave-to-wave interference during combining. As previously noted, within the context of Radio Frequency over Glass (RFoG), the linear optical system is a carrier of an RF carrier signal; in other words, the optical signaling is a "carrier of carriers". The RF carriers are at non-interfering frequencies in the electrical domain, with each carrying unique modulation. When the RF carriers are combined in the electrical domain, the resulting continuously varying voltage results, which is in turn modulated onto an optical carrier. Since OBI is only created when passively combining optical signals of similar wavelength, beat interference (in the electrical domain) does not occur when combining RF carriers which are at non-interfering frequencies in the electrical domain. More directly, the various disclosed embodiments seek to isolate interferences which are introduced by the inherent characteristics of the signaling medium (e.g., carrier wave), and not a function of the signaling protocol, channel, or environment.

Referring back to FIG. 5, at step 506 of the method 500, the converted one or more of signals are split or combined into an aggregate signal.

In one exemplary embodiment, the received signals are combined by summation. During operation, the combiner element linearly adds the converted signals to produce an output aggregate signal. While the disclosed embodiments are primarily described in terms of linear superposition (summation), those of ordinary skill in the related arts will readily appreciate the wide variety of other combining operations which may be substituted with equal success, given the contents of the present disclosure. Common examples of combining include e.g., summation, addition, Boolean arithmetic, multiplication, convolution, linear transformation, etc.

In one exemplary embodiment, a received signal is split into multiple signals. In some cases, the splitting may evenly distribute power. For example, evenly splitting a signal into N copies of the signal at 1/Nth the power of the original signal. In other embodiments, the signal is unevenly split; for example, the signal may be split into N copies of the signal, at least one of which is higher in power than the others. In some cases, the splitting may additionally require active boosting of the signal power of one or more of the output signals.

In one embodiment, one or more additional steps of error recovery and signal reconstruction may be performed, so as to ensure that the signals are not distorted (or minimally distorted) before combination. Error recovery may be based on the signal content. For example, certain message formats may support forward error correction (FEC), parity, running disparity, or combinations thereof (e.g., line-coding, etc.). In some cases, signal reconstruction may be implemented with active signal generation based on error recovery. In other embodiments, signal reconstruction may merely condition the signal by amplifying, or attenuating various portions or characteristics of the signaling. In other cases, the receiver or associated cable may affect certain wavelengths of light differently than other wavelengths, accordingly various spectral components may need to be emphasized/deemphasized. For example, in one variant, the signals are demodulated to digital baseband, and the embedded FEC is processed to recover any bit errors. The resulting corrected signal is re-modulated back to RF prior to combination.

In some variants, signal conditioning may be performed in accordance with one or more network and/or device considerations. For example, certain communication resources may experience different link qualities with respect to the active splitter/combiner; accordingly, various ones of the signals corresponding to the communications resources may be emphasized or de-emphasized so as to optimize network operation. For example, in some cases, it may be desirable to equalize received power across each of the communication resources, so as to ensure that network services are consistent for all users. In other cases, the network operator may prefer to emphasize certain ones of the communication resources so as to ensure that they are preferentially serviced (i.e., that some links are more robust relative to other links). Still other schemes for maximizing network resource utilization based on e.g., various business considerations, network capacity, user requirements, etc. will be readily apparent to those of ordinary skill, given the contents of the present disclosure.

At step 508 of the method 500, the resulting signal is converted to the carrier wave-based communication and transmitted.

In one embodiment, the output aggregate signal is converted from an electrical signal to an optical intensity. In one exemplary embodiment, the electrical-to-optical conversion is performed with a laser diode that is configured to emit laser light as a function of electrical current. The resulting emitted light (at the appropriate wavelength) is modulated in accordance with the electrical aggregate signal.

In one exemplary embodiment, the output of the active splitter/combiner apparatus is the same wave-based medium of signaling as the input; for example, the output optical signal is of the same wavelength (1610 nm) as the received input optical signals. However, those of ordinary skill in the related arts will readily appreciate that the input and output wave-based mediums could be made different. For example, the active splitter/combiner may receive input optical signaling at 1610 nm, but output an aggregated signal at 1550 nm (e.g., so as to be provided to another communication resource (e.g., another CPE), rather than the upstream device).

Moreover, those of ordinary skill in the related arts will readily appreciate that the wave-based medium of the input and output may be substantially different. For example, in some embodiments, the input signaling is optical however, the combined output is generated as an RF signal (e.g., input to another multi-port optical resource). Still other variations may dynamically choose which wave-based medium is used for output; in some cases, this may be performed dynamically based on e.g., dynamic network considerations. For example, in some cases, the active splitter/combiner may be able to provide uplink connectivity via an optical interface and an RF interface, the selection being based on either the network operator's discretion or e.g., dynamically or semi-dynamically changing network conditions. To these ends, various embodiments of the present disclosure may use tunable lasers for the uplink, or alternatively pluggable lasers which can be manually changed out to select a different wavelength.

In some embodiments, the wave-based communication is further combined or mixed with other wave-based communications. For example, within the context of FIG. 4, upstream optical signaling is recombined with downstream optical signaling for delivery via the PON. In some embodiments the other wave-based communications may occur at different frequencies (or wavelengths). Still other variants may incorporate other stages of active and/or passive combining for distribution throughout the network.

Example Operation—

Figure 6:
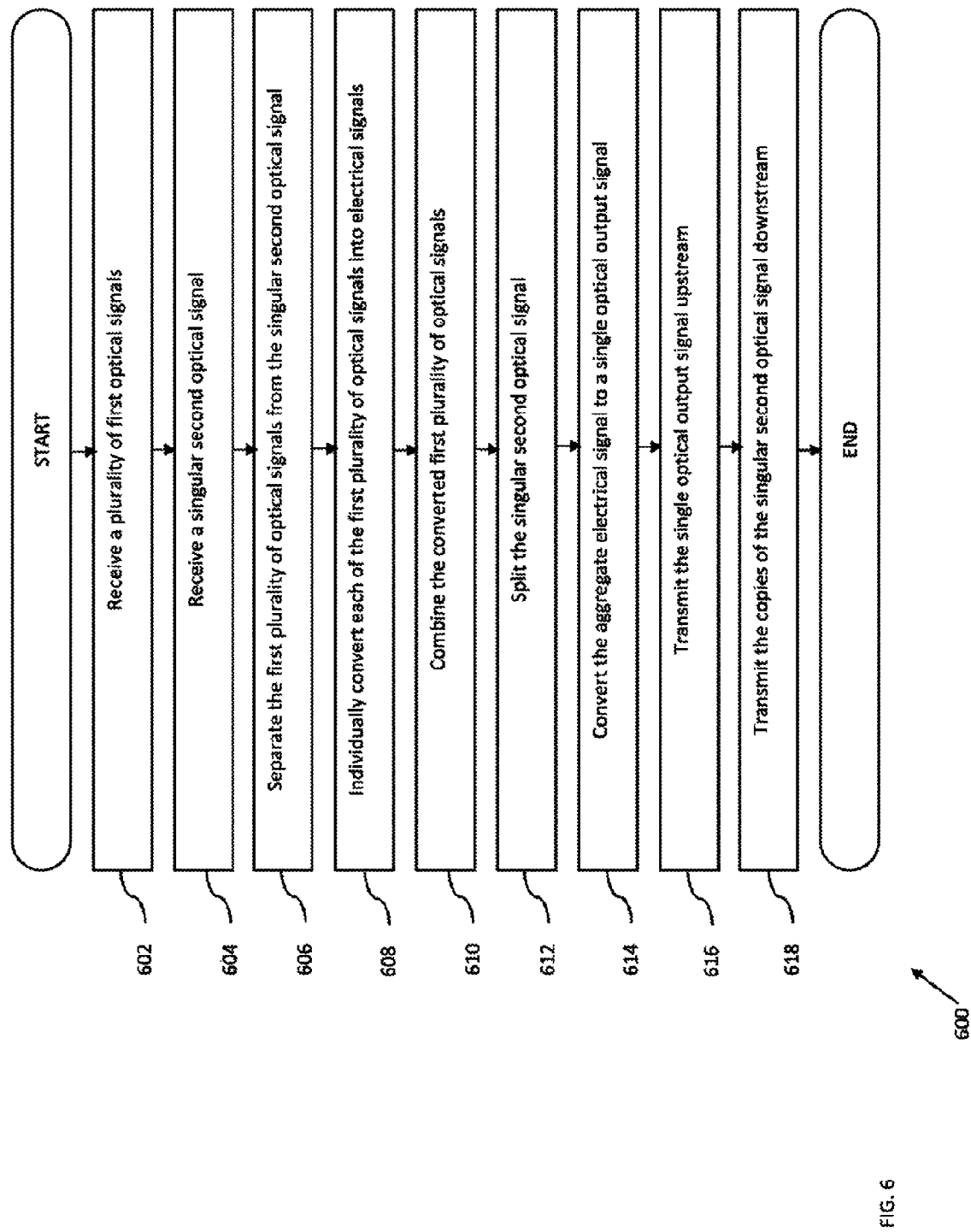
FIG. 6 is a logical flow diagram of one exemplary method for removing Optical Beat Interference (OBI) from a Passive Optical Network (PON).

FIG. 6 illustrates one exemplary method 600 for removing Optical Beat Interference (OBI) from a Passive Optical Network (PON).

At step 602 of the method 600, an active splitter/combiner receives a plurality (N) of first optical signals from a corresponding plurality of Optical Network Units (ONUs) associated with a number of Customer Premises Equipment (CPE). In one exemplary embodiment, the first optical signals include optical carrier wave signaling which carries RF carrier wave signaling in accordance with RF over Glass (RFoG). In one such variant, the first optical signals are each provided at the same or substantially similar wavelength (varying by manufacturing tolerances), and include RF carrier wave signaling at non-interfering frequencies.

At step 604 of the method 600, the active splitter/combiner receives a singular second optical signal from an upstream device (such as the multi-port optical resource 240 which receives RF content from the upstream resource 255 of FIG. 2 and generates the corresponding singular second optical signal).

At step 606 of the method 600, the active splitter/combiner separates the first plurality of optical signals from the singular second optical signal. In one exemplary embodiment, the separation of optical signals is performed via an array of three (3) port optical circulators which are configured to pass light originating from a first port to a second port, but not to a third port. Light originating from the second port is passed to the third port, but not the first port. In this manner, the first optical signals are directed to a combiner element, and the single second optical signal is directed to a splitter element.

At step 608 of the method 600, the first plurality of optical signals are each individually converted into electrical signals (e.g., RF signaling) as a function of their optical intensity or power, in preparation for combining. In the process of conversion, the signaling changes from light (at substantially similar wavelengths) to RF signaling (which uses non-interfering frequencies in the electrical domain).

At step 610 of the method 600, the first plurality of converted electrical signals are combined together into a single aggregate electrical signal via instantaneous summation. In the exemplary embodiment, summation of the distinct RF signals does not result in wave-to-wave interference effects as the RF signaling is performed at non-interfering frequencies.

At step 612 of the method 600, the singular second optical signal is split into N copies of the singular second optical signal at 1/Nth the power via a conventional optical power splitter.

At step 614 of the method 600, the aggregate electrical signal is converted to a single optical output signal. In one exemplary embodiment, the summed RF signaling is used to modulate a final upstream laser output, resulting in an RFoG signal suitable for transmission via fiber optics.

At step 616 of the method 600, the single optical output signal is transmitted upstream. At step 618 of the method 600, the N copies of the singular second optical signal are transmitted downstream.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode(s) presently contemplated. This description is in no way meant to be limiting, but rather should be taken as illustrative of the general principles of the disclosure.

What is claimed is:

1. An active splitter/combiner apparatus, comprising:
an upstream port configured to concurrently transmit and receive optical signaling;
a plurality of downstream ports, each of said plurality of downstream ports configured to transmit and receive optical signaling;
a plurality of optical-to-electrical converters in signal communication with said plurality of downstream ports, said plurality of optical-to-electrical converters configured to convert a plurality of upstream optical signals to corresponding electrical upstream signals;
an electrical combiner configured to generate an aggregate upstream electrical signal from said corresponding electrical upstream signals;
an electrical-to-optical converter configured to convert said aggregate upstream electrical signal to an aggregate upstream optical signal, said electrical-to-optical converter in signal communication with said upstream port; and
a plurality of optical circulators in signal communication with said plurality of downstream ports, each of said plurality of optical circulators configured to (i) pass optical signaling received via a corresponding downstream port to a corresponding optical-to-electrical converter, and (ii) prevent optical signaling to be transmitted via said corresponding downstream port from passing to said corresponding optical-to-electrical converter;
wherein said upstream port is configured to concurrently (i) transmit said aggregate upstream optical signal and (ii) receive a downstream optical signal.

2. The active splitter/combiner apparatus of claim 1, wherein said plurality of respective downstream ports are configured to connect via a point-to-point connection to each of a plurality of optical network units (ONUs) corresponding to a plurality of respective customer premises equipment (CPE).

3. The active splitter/combiner apparatus of claim 1, wherein said upstream port is configured to connect via a point-to-point connection to a multi-port optical resource.

4. The active splitter/combiner apparatus of claim 1, wherein said upstream port and one or more of said plurality of downstream ports are configured to operate at optical wavelengths.

5. The active splitter/combiner apparatus of claim 1, wherein said optical signaling comprises Radio Frequency over Glass (RFoG) signaling.

6. The active splitter/combiner apparatus of claim 1, further comprising an optical power splitter in signal communication with said upstream port and said plurality of downstream ports, said optical power splitter configured to split said downstream optical signal into a plurality of downstream copies.

7. The active splitter/combiner apparatus of claim 1, further comprising:
another optical circulator in signal communication with said upstream port, said another optical circulator configured to (i) pass said aggregate upstream optical signal to said upstream port, and (ii) prevent said downstream optical signal from passing to said electrical-to-optical converter.

8. An active splitter and combiner apparatus, comprising:
an upstream port comprising means for concurrently transmitting and receiving optical signaling;
a plurality of downstream ports, each of said plurality of downstream ports comprising means for transmitting and receiving optical signaling;
a plurality of optical-to-electrical converters in signal communication with said plurality of downstream ports, said plurality of optical-to-electrical converters comprising means for converting a plurality of upstream optical signals to corresponding electrical upstream signals;
an electrical combiner comprising means for generating an aggregate upstream electrical signal from said corresponding electrical upstream signals;
an electrical-to-optical converter comprising means for converting said aggregate upstream electrical signal to an aggregate upstream optical signal, said electrical-to-optical converter in signal communication with said upstream port; and a plurality of optical circulators in signal communication with said plurality of downstream ports, each of said plurality of optical circulators comprising means for passing optical signaling received via a corresponding downstream port to a corresponding optical-to-electrical converter, and means for preventing optical signaling via said corresponding downstream port from passing to said corresponding optical-to-electrical converter;

wherein said upstream port comprises means for concurrently transmitting said aggregate upstream optical signal and means for receiving a downstream optical signal.

9. The active splitter and combiner apparatus of claim 7, wherein said plurality of respective downstream ports comprise means for connecting via a point-to-point connection to each of a plurality of optical network units (ONUs) corresponding to a plurality of respective customer premises equipment (CPE).

10. The active splitter and combiner apparatus of claim 7, wherein said optical signaling comprises Radio Frequency over Glass (RFoG) signaling.

11. The active splitter and combiner apparatus of claim 7, further comprising an optical power splitter in signal communication with said upstream port and said plurality of downstream ports, said optical power splitter comprising means for splitting said downstream optical signal into a plurality of downstream copies.

12. A computerized method for removing beat interference from splitting and combining of signals, said computerized method comprising:

concurrently transmitting and receiving optical signaling via an upstream port;

transmitting and receiving optical signaling via individual ones of a plurality of downstream ports;

converting, via a plurality of optical-to-electrical converters in signal communication with respective ones of said plurality of downstream ports, a plurality of upstream optical signals to corresponding electrical upstream signals;

generating, via an electrical combiner, an aggregate upstream electrical signal from said corresponding electrical upstream signals;

converting, via an electrical-to-optical converter in signal communication with said upstream port, said aggregate upstream electrical signal to an aggregate upstream optical signal;

passing, via individual ones of a plurality of optical circulators in signal communication with respective ones of said plurality of downstream ports, optical signaling received via a corresponding downstream port to a corresponding optical-to-electrical converter;

preventing, via said individual ones of a plurality of optical circulators, optical signaling to be transmitted via said corresponding downstream port from passing to said corresponding optical-to-electrical converter;

concurrently transmitting said aggregate upstream optical signal and receiving a downstream optical signal via said upstream port.

13. The computerized method of claim 12, further comprising said plurality of respective downstream ports connecting, via a point-to-point connection, to each of a plurality of optical network units (ONUs) corresponding to a plurality of respective customer premises equipment (CPE).

14. The computerized method of claim 13, further comprising causing connecting said upstream port, via a point-to-point connection, to a multi-port optical resource.

15. The computerized method of claim 13, further comprising causing operating said upstream port and one or more of said plurality of downstream ports at one or more optical wavelengths.

16. The computerized method of claim 13, further comprising routing said optical signaling received from said plurality of ONUs via corresponding optical circulators.

17. The computerized method of claim 12, wherein said concurrently transmitting and receiving optical signaling via said upstream port comprises concurrently transmitting and receiving Radio Frequency over Glass (RFoG) signaling via said upstream port.

18. The computerized method of claim 17, further comprising splitting, via an optical power splitter, said downstream optical signal into a plurality of downstream copies.

19. The computerized method of claim 18, further comprising coupling said optical power splitter to said upstream port and said plurality of downstream ports.

20. The computerized method of claim 12, further comprising equalizing one or more signal strengths corresponding to said aggregate upstream optical signal.

* * * * *